Nov. 15, 1960   C. A. SCHREIBER ET AL   2,960,231
CLASSIFIER RAKE BLADE AND BLADE ASSEMBLY
Filed Feb. 3, 1958   2 Sheets-Sheet 1
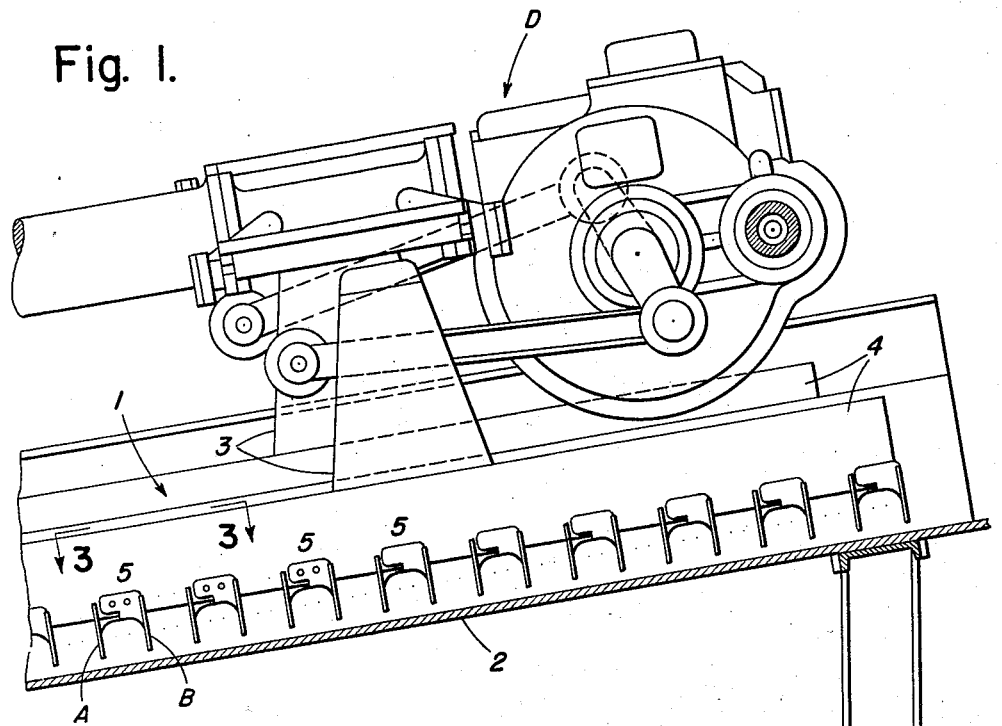
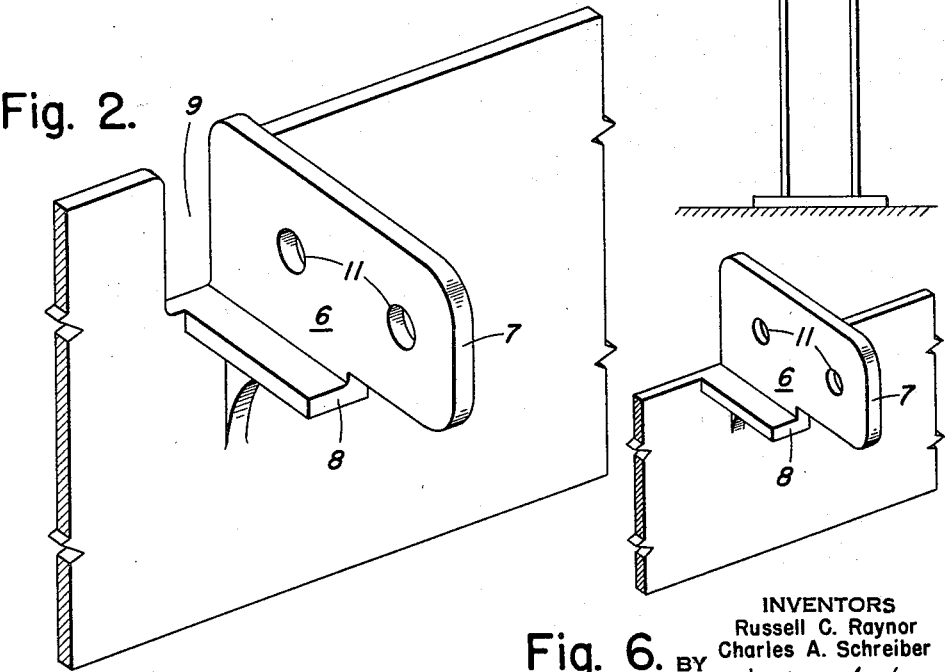
INVENTORS
Russell C. Raynor
Charles A. Schreiber
BY William J. Henry
ATTORNEY Nov. 15, 1960   C. A. SCHREIBER ET AL   2,960,231
CLASSIFIER RAKE BLADE AND BLADE ASSEMBLY
Filed Feb. 3, 1958   2 Sheets-Sheet 2
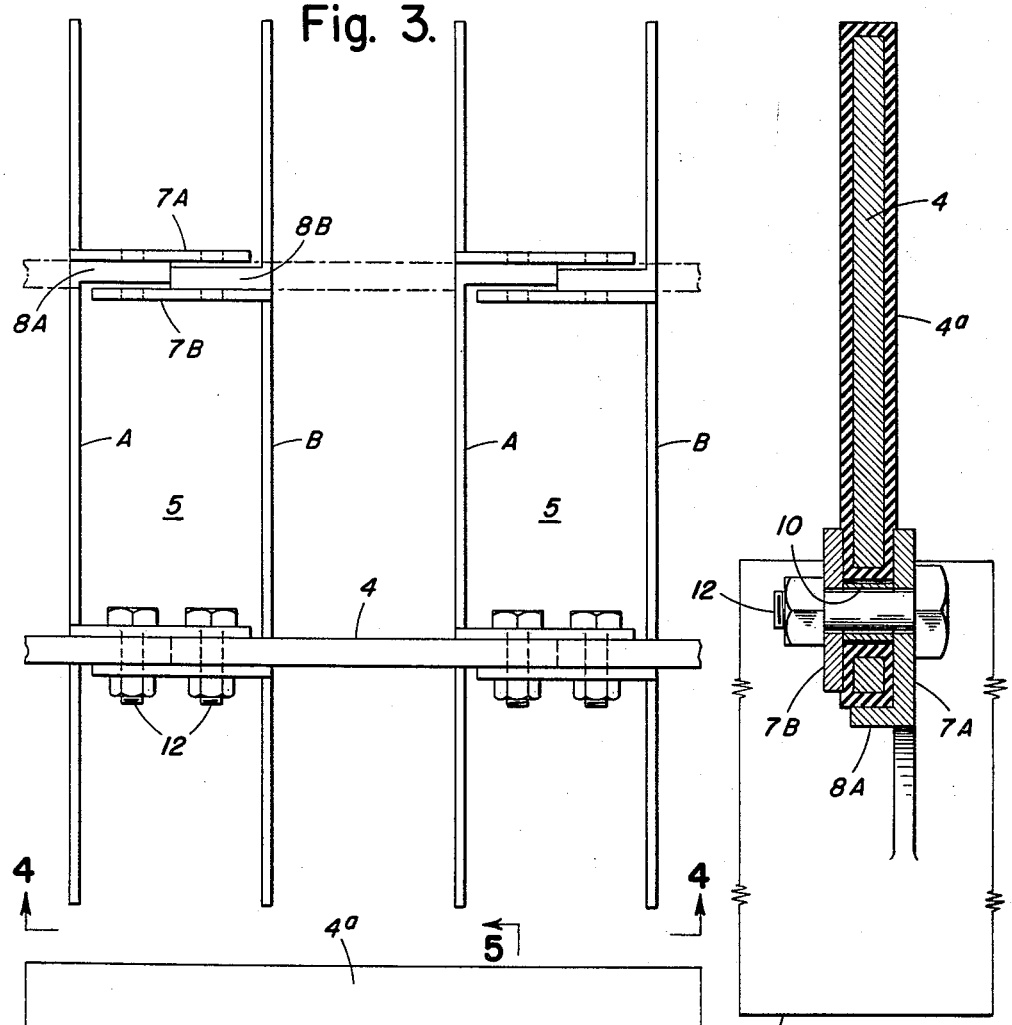
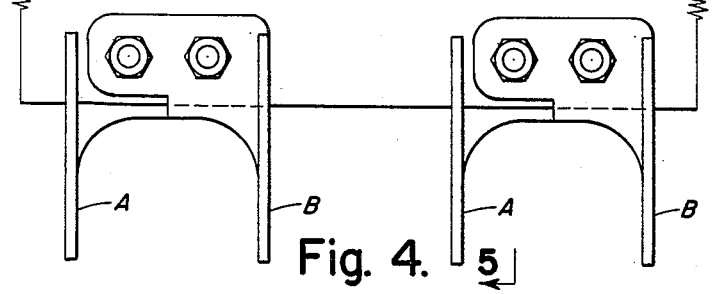
INVENTORS
Russell C. Raynor
Charles A. Schreiber
BY William J. Henry
ATTORNEY

United States Patent Office 2,960,231
Patented Nov. 15, 1960

2,960,231

CLASSIFIER RAKE BLADE AND BLADE ASSEMBLY

Charles A. Schreiber, Springdale, Conn., and Russell C. Raynor, South Salem, N.Y., assignors to Dorr-Oliver Incorporated, Stamford, Conn., a corporation of Delaware Filed Feb. 3, 1958, Ser. No. 712,807

9 Claims. (Cl. 209—483)

This invention relates to the rake structure for rake type classifiers, or like apparatus, and is particularly directed to a rake blade and a rake blade assembly for the same.

Heretofore rake blades have been attached to parallel stringers of a rake structure with the use of clip angles which were welded to the stringers and the blades bolted to the clip angles. In welding the clip angles to the stringers, internal stresses are set up which result in stringer warpage and require, after the clips are all welded thereto, that the stringer be heat treated to relive these localized stresses and the stringer realigned or straightened before the blades can be attached. Obviously, the above procedures (welding, stress relieving and straightening) are time-consuming and expensive.

A primary object of this invention, therefore, is to overcome the aforementioned procedures and disadvantages thereof.

This invention not only eliminates the clip angle, its weldment and resultant disadvantages but provides a smooth surfaced stringer to which a protective or acid-proof coating can be quickly and economically applied. The protective coating, such as rubber, must be used when the feed to the classifier has corrosive characteristics. In these installations stringers are often covered with rubber and the blades are made of stainless steel and attached to the stringers with stainless steel bolts and nuts.

It is another object of this invention, therefore, to provide a stringer which is easily coated, a blade which does not perforate or disrupt the protective coating when being attached to the stringer and under operating conditions.

A further object of this invention is to provide a rake blade assembly whereby a 50% reduction can be realized in fastening means therefor.

Another object of this invention is to provide a rake blade in intimate contact with a stringer which aids in strengthening the stringer traversely of its length.

Another object of this invention is to provide a rake blade which can be easily and quickly attached and detached to replace damaged and worn blades.

Another object of this invention is to reduce the number of elements in rake structures, their individual expense and the cost of assembling each element heretofore required to attach a rake blade to a stringer.

In order that it may be clearly understood and readily carried into effect, the invention will now be described, by way of example, with reference to the accompanying drawings.

In the drawings:

Fig. 1 shows a side elevation of a portion of a rake type classifier.

Fig. 2 shows a partial isometric view of a slotted rake blade and a detailed showing of a vertical and horizontally flanged integral lug of this invention.

Fig. 3 is a plan view of a portion of a rake assembly according to this invention showing the manner in which the blades are mounted on the stringer in a back-to-back relation to allow a single fastening means to attach a pair of blades to a stringer and form the blade assembly.

Fig. 4 is a side view of Fig. 3 in which the stringer is provided with a protective coating of rubber or the like.

Fig. 5 is a cross sectional view on lines 5—5 of Fig. 4.

Fig. 6 shows a modification of Figure 2.

Referring to Fig. 1, letter D generally designates the mechanism which drives the rake structure, generally designated by 1, up an incline slope 2. The rake structure includes carrier plates or hangers 3, stringers 4 and plurality of rake assemblies 5 longitudinally spaced along said stringers. Rake assemblies 5 include blades A and B. The carrier plate and stringers are attached in any suitable manner as is the connection between the driving mechanism and the hangers.

Details of the driving mechanism and its operation form no part of this invention and are fully disclosed in Patent No. 2,647,631 to C. H. Scott, issued August 4, 1953. As shown in the above patent, driving mechanism D reciprocates the rake structure and lifts the structure away from the incline slope 2 on the downward stroke. The material carried by each blade is incrementally moved along the slope 2 by the reciprocating blades A and B of assemblies 5.

A detail view of the rake blade of this invention is shown in Fig. 2. A blade and a lug 7 are preferably integrally cast to provide a lugged blade having a side flange 7 and a bottom flange 8. Each side flange 7 is provided with mounting holes 11 and extends beyond the bottom flange 8. As shown, lug 7 is placed adjacent a slot 9; however, lug 7 may be cast or attached directly to the top edge of the blade as shown in Fig. 6. The arrangement shown in Fig. 6 is especially useful on the rake structure at the upper portion on the incline 2 or the discharge end of the rake structure.

Another important aspect of this invention is the use of the lugged blades above described to form a rake blade assembly 5 to facilitate attaching the blades to the stringers with a minimum of fastening means 12. As is clearly shown in Fig. 3, the lugs on the blades are so spaced that the side flange of blade A is placed against the inside surface of one stringer and the outside surface of another stringer and vice versa for blade B. In this manner two identical blades can be joined by a single fastening means such as the bolts and nuts shown. By this arrangement two rake blades are securely fastened to the stringer and at the same time aid in providing and maintaining stringer alignment since the vertical flange 7 of each blade A and B is placed on opposite sides of the stringers 4. The bottom flange 8 of blades A and B is of such a length that close tolerance and precise alignment of the blades A and B is automatically established on assembly. It is noted that the distance between blades A and B of rake assembly 5 and between each rake assembly is essential for proper operation of a rake classifier. The bottom flange 8 also reduces the sheer stresses to which the bolts are subjected during the operation of the rake allowing economies in the strength requirement for fastening means 12.

In installations where the rake structure is subjected to corrosive materials, the blades and lugs are stainless steel and the stringers are coated with an acid-proof surface such as rubber, or the like, as shown in Figs. 4 and 5. Since protruding, complicated stringer surfaces are eliminated by this invention, a protective coating can be easily and economically applied thereto. In addition, the protective coating 4a is not damaged by the blades during assembly or operation since the lugged blade of this invention provides adequate bearing area on the coated surfaces of the stringer. In the modification best illustrated by Fig. 5 a cylindrical spacer 10 may be inserted inside each mounting hole 11 of the stringer to prevent breaking the acid-proof coating 4a by exerting excess pressure on flanges 7A and 7B with fastening 12. In Fig. 5, 4 is a stringer having a rubber coating 4a, the vertical flange blade A is designated 7A and the side and bottom flanges of blade B are respectively designated 7B and 8B.

It will be evident from the foregoing that this invention provides a rugged rake structure utilizing a minimum of elements to be assembled in a rake structure, requiring a minimum of time expenditure for assembly, and a substantial reduction in the overall cost of such equipment.

The foregoing description is given by way of example, but the scope of this invention is limited only by the appended claims.

We claim:

1. A rake blade for a reciprocating rake classifier comprising an elongated generally rectangular blade member, a pair of slots cut into said blade along one longitudinal edge thereof, lug means attached to said blade adjacent said slots, said lug means comprising a horizontally outstanding bottom flange and a vertically outstanding side flange perpendicular to said bottom flange and integral therewith, the length of said bottom flange being substantially equal to half the distance required between blades for a given rake classifier and the length of said vertical flange being substantially equal to said distance.

2. A rake blade assembly comprising longitudinally extending stringer means, a plurality of identical paired blades longitudinally spaced along said stringer means in back-to-back relation, lug means fixed to each said blade at one side thereof, said lug means extending between said paired blades and comprising a horizontal outstanding bottom flange and a vertically outstanding side flange perpendicular thereto, wherein said bottom flange is equal to substantially half the distance required between blades for a given rake classifier and the length of said vertical flange is substantially equal to said distance, and common fastening means to removably affix respective associated lug means of the paired blades to said stringer means, with stringer means interposed between the vertical flanges of respective lug means of the paired blades.

3. Rake blade assembly for a rake type classifier comprising longitudinal stringer means, a plurality of rake blades longitudinally spaced along said stringer means, lug means fixed to said blade at one side thereof, said lug means comprising an integral outstanding horizontal bottom flange and a vertical side flange extending between paired blades, wherein said bottom flange is equal to substantially half the distance required between blades for a given rake classifier and the length of said vertical flange is substantially equal to said distance, and common fastening means to removably affix respective associated lug means of the paired blades to said stringer means, with stringer means interposed between the vertical flanges of respective lug means of the paired blades.

4. In a rake classifier for mechanical classification of corrosive materials, a rake assembly comprising smooth surfaced longitudinally extending stringer means, a corrosion resistant coating completely covering said stringer means, a blade assembly comprising a pair of blades in back-to-back relation having transversely extending lug means with the lug means of one of said paired blades placed adjacent the corresponding lug means of the other of said paired blades, where each lug means comprises a bottom flange and an integral side flange and a plurality of blade assemblies are spaced longitudinally along said stringer means, common fastening means attaching said adjacent lugs to said stringer means, and hanger means connecting said stringer means with a driving means.

5. Rake blade assembly for a rake type classifier comprising at least a pair of longitudinal stringer members provided with a corrosion resistant rubber coating which also lines the inner faces of bolt holes provided in the stringer members; a plurality of identical paired rake blades transversal of and longitudinally spaced along said stringer members; lug means fixed to said blades at one side thereof, comprising an integral horizontal bottom flange and a vertical side flange extending between said paired blades, the length of said bottom flange being at most about equal to half the distance required between a pair of blades and adapted to support a corresponding rubber coated stringer portion against shocks, the length of the vertical flange extending beyond that of the length of the associated bottom flange and so arranged that respective vertical flanges are located both in the space between said pair of blades and on opposite sides of the associated stringer member; common fastening means for said pair of rake blades, comprising a spacer sleeve extending through said rubber lined bolt holes, and a fastening screw bolt extending through said spacer sleeve whereby opposedly arranged associated vertical flanges of respective lugs are tightened against respective end faces of said spacer sleeve in a manner to prevent damage to said rubber coating by the associated pair of vertical flanges.

6. The rake blade assembly according to claim 1, wherein said sleeve is fitted over said bolt and also fitted into said rubber lined hole of the stringer in such a manner that shock loads encountered by the blades are absorbed jointly by all the rubber engaging faces of said lug means and said sleeve.

7. Rake blade assembly for a rake type classifier comprising at least a pair of longitudinal stringer member; a plurality of identical paired rake blades transversal and longitudinally spaced along said stringer members; lug means fixed to said blades at one side thereof, comprising an integral horizontal bottom flange and a vertical side flange extending between said paired blades, the length of said bottom flange being at most about equal to half the distance required between a pair of blades and adapted to support a corresponding rubber coated stringer portion against shocks, the length of the vertical flange extending beyond that of the length of the associated bottom flange and so arranged that respective vertical flanges are located both in the space between said pair of blades and on opposite sides of the associated stringer member; common fastening means for said pair of rake blades, comprising a spacer sleeve extending through holes in said stringer member, and a fastening screw bolt extending through said spacer sleeve whereby opposedly arranged associated vertical flanges of respective lugs are tightened against respective end faces of said spacer sleeve; and resiliently deformable rubber padding means interposed between the stringer and the adjoining inner vertical and horizontal flange faces of the lugs, and also interposed between the outer face of said sleeve and the inner face of the respective hole in the stringer member whereby shock loads encountered by the blades are adapted to be absorbed jointly by all the rubber engaging faces of said lug means and said sleeve.

8. A rake blade assembly comprising at least a pair of substantially parallel stringer members; a plurality of identical paired blades in back-to-back arrangement transversal of said stringer members and longitudinally spaced along said stringer members; lug means fixed to each blade at one side thereof, comprising a vertical side flange extending between paired blades arranged in back-to-back relationship so that respective associated vertical flanges are located both in the space between said pair of blades and on opposite sides of the associated stringer member, said lugs on each blade being differently spaced from the respective associated ends of the blade so as to be reversible for said back-to-back relationship, and common fastening means for each pair of blades for fixing the associated vertical flanges relative to each other and to the stringer member.

9. A rake blade assembly comprising at least a pair of longitudinal stringer members provided with a corrosion resistant rubber coating which also lines the inner faces of bolt holes provided in the stringer members; a plurality of identical paired rake blades transversal and longitudinally spaced along said stringer members; lug means fixed to said blades at one side thereof, comprising a vertical side flange extending between said paired blades arranged in back-to-back relationship, said lugs being differently spaced from the respective associated ends of the blade so as to be reversible for said back-to-back relationship, so that respective associated vertical flanges are located both in the space between said pair of blades and on opposite sides of the associated stringer member, and common fastening means for said pair of rake blades, comprising a spacer sleeve extending through said rubber lined bolt holes, and a fastening screw bolt extending through said spacer sleeve whereby opposedly arranged associated vertical flanges of respective lugs are tightened against respective end faces of said spacer sleeve in a manner to prevent damage of said rubber coating by the associated pair of vertical flanges.

References Cited in the file of this patent

UNITED STATES PATENTS

| | | |
|---|---|---|
| 849,379 | Dorr | Apr. 9, 1907 |
| 1,022,387 | Czimeg | Apr. 2, 1912 |
| 2,025,690 | McArthur | Dec. 24, 1935 |
| 2,632,709 | Schiermeier | Mar. 24, 1953 |
| 2,738,237 | Bekker | Mar. 13, 1956 |
| 2,758,981 | Cooke et al. | Aug. 14, 1956 |